(12) United States Patent
Niemz

(10) Patent No.: US 9,211,912 B2
(45) Date of Patent: Dec. 15, 2015

(54) METHOD AND CONTROLLER FOR CALIBRATING AN AUTOMATICALLY-STEERING PARKING AID

(75) Inventor: Volker Niemz, Rutesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 483 days.

(21) Appl. No.: 13/388,928

(22) PCT Filed: Aug. 3, 2010

(86) PCT No.: PCT/EP2010/061256
§ 371 (c)(1),
(2), (4) Date: Apr. 18, 2012

(87) PCT Pub. No.: WO2011/015569
PCT Pub. Date: Feb. 10, 2011

(65) Prior Publication Data
US 2012/0197478 A1   Aug. 2, 2012

(30) Foreign Application Priority Data
Aug. 5, 2009   (DE) .................... 10 2009 028 261

(51) Int. Cl.
*G01C 22/00* (2006.01)
*G05D 1/00* (2006.01)
*B62D 15/02* (2006.01)

(52) U.S. Cl.
CPC .................. *B62D 15/0285* (2013.01)

(58) Field of Classification Search
CPC . B60T 2201/10; B62D 15/0285; B62D 6/002
USPC ............................................ 701/25
See application file for complete search history.

(56) References Cited

U.S. PATENT DOCUMENTS

| | | | |
|---|---|---|---|
| 6,059,063 A * | 5/2000 | Shimizu et al. | 180/204 |
| 6,102,147 A * | 8/2000 | Shimizu et al. | 180/204 |
| 7,487,020 B2 * | 2/2009 | Iwazaki et al. | 701/41 |
| 7,529,600 B2 * | 5/2009 | Mori et al. | 701/1 |
| 8,180,525 B2 * | 5/2012 | Luke et al. | 701/36 |

(Continued)

FOREIGN PATENT DOCUMENTS

| | | |
|---|---|---|
| CN | 101524998 | 9/2009 |
| CN | 101758809 | 6/2010 |

(Continued)

*Primary Examiner* — Jonathan L Sample
*Assistant Examiner* — Harry Oh
(74) *Attorney, Agent, or Firm* — Kenyon & Kenyon LLP (57) ABSTRACT

A method for calibrating a parking aid, which is configured to actively control a steering angle of a vehicle, by: automatically detecting a parking space with the aid of sensors and calculating a target course in light of the detected parking space. The steering angle is controlled based on the calculated target course, with a controllable actuator. The method accounts for an error by the actuator by: determining an actual course, which results from controlling according to the target course; comparing the actual course to the target course and ascertaining the error resulting from the comparison; and generating a correction parameter, which is linked to the error by a monotonic function. The correction parameter allows the actuator's behavior to be considered. Controlling the steering angle is done based on a combination of the set angle with the correction parameter. A related controller for implementing the method is also described.

7 Claims, 2 Drawing Sheets

(56) References Cited

U.S. PATENT DOCUMENTS

| | | | |
|---|---|---|---|
| 2001/0023380 A1* | 9/2001 | Mizutani | 701/23 |
| 2002/0175832 A1* | 11/2002 | Mizusawa et al. | 340/932.2 |
| 2003/0045973 A1* | 3/2003 | Okamoto | 701/1 |
| 2004/0267420 A1* | 12/2004 | Tanaka et al. | 701/36 |
| 2005/0269145 A1* | 12/2005 | Schmidt | 180/204 |
| 2005/0273236 A1* | 12/2005 | Mori et al. | 701/41 |
| 2006/0113119 A1* | 6/2006 | Dudeck et al. | 180/6.2 |
| 2006/0190147 A1* | 8/2006 | Lee et al. | 701/26 |
| 2007/0051547 A1* | 3/2007 | Fischer et al. | 180/204 |
| 2008/0177443 A1* | 7/2008 | Lee et al. | 701/41 |
| 2009/0091475 A1* | 4/2009 | Watanabe et al. | 340/932.2 |
| 2009/0157260 A1* | 6/2009 | Lee | 701/41 |
| 2009/0243887 A1* | 10/2009 | Hering et al. | 340/932.2 |
| 2010/0106372 A1* | 4/2010 | Watanabe et al. | 701/41 |
| 2010/0219010 A1* | 9/2010 | Kadowaki et al. | 180/204 |
| 2010/0231416 A1* | 9/2010 | Wu et al. | 340/932.2 |
| 2010/0332080 A1* | 12/2010 | Bae | 701/42 |
| 2011/0082613 A1* | 4/2011 | Oetiker et al. | 701/25 |
| 2011/0144865 A1* | 6/2011 | Niemz | 701/42 |
| 2011/0273310 A1* | 11/2011 | Kadowaki et al. | 340/932.2 |

FOREIGN PATENT DOCUMENTS

| | | |
|---|---|---|
| DE | 10 2005 014983 | 1/2006 |
| DE | 10 2007 037 645 | 2/2009 |
| EP | 0 872 402 | 10/1998 |
| EP | 1 602 560 | 12/2005 |
| JP | 1-187700 | 7/1989 |
| JP | 10-287260 | 10/1998 |
| JP | 2001-18821 | 1/2001 |
| JP | 2004-291866 | 10/2004 |
| JP | 2004-345406 | 12/2004 |
| JP | 2005-35498 | 2/2005 |
| JP | 2005-67607 | 3/2005 |
| JP | 2007-302040 | 11/2007 |

\* cited by examiner

METHOD AND CONTROLLER FOR CALIBRATING AN AUTOMATICALLY-STEERING PARKING AID

FIELD OF THE INVENTION

The present invention relates to (semi-)automatic parking assistants, which assist in parking in a parking space via automatic steering.

BACKGROUND INFORMATION

Such parking systems have sensors, in order to detect a parking space while driving by, and in order to drive into the parking space in a highly optimized manner while subsequently parking in reverse gear. In this connection, the steering wheel is automatically steered, an actuator operating the steering wheel during the reverse travel, the actuator being connected to a controller that provides the calculated, optimum steering angle and, consequently, the parking track.

According to the related art, it is assumed that the predetermined parking track, i.e., the target parking track and, therefore, the (current) steering angle, is implemented accurately by the actuator and the steering gear. In the related art, this is accomplished, for example, in that the corresponding steering components are dimensioned according to the load, and a high steering torque provides for the carrying out of the steering setpoint input. In like manner, it is known that reduced maximum steering angles may be used, in order to provide a safety margin with respect to the steering angle actually possible, so that precise implementation independent of the steering angle magnitude may be assumed.

SUMMARY OF THE INVENTION

According to the exemplary embodiments and/or exemplary methods of the present invention, it has been recognized that such control methods, in which it is assumed that the input is precisely implemented, may be affected, e.g., by ageing processes, or not utilized to the full extent with regard to their design.

Therefore, an objective of the exemplary embodiments and/or exemplary methods of the present invention is to provide a method and a controller, by which parking aids may be controlled precisely. In particular, an objective of the exemplary embodiments and/or exemplary methods of the present invention is to provide a parking aid that is even precise when the relevant mechanical systems are subject to a source of error.

The objective of the exemplary embodiments and/or exemplary methods of the present invention is achieved by the method and the controller according to the description herein.

The basis of the exemplary embodiments and/or exemplary methods of the present invention is not to provide the steering angle, using a control method in which it is assumed that a setpoint input is accurately adhered to, but using a regulating method which may take into account an error occurring during steering, so that the error is at least partially compensated for. In this manner, in particular, parking systems may be provided in which a more or less marked steering error occurs in response to a marked displacement, which means that precise steering of the vehicle during parking is also possible in faulty systems. To this end, the method provides for a target parking track to be calculated (which is also calculated in the related art and is directly used in the related art for controlling an actuator), as well as for an actual course to be determined, in order to detect, by comparison, an error that is compensated for according to the present invention. The compensation may be provided by correcting the control inputs, which are supplied by the actuator, or by calibrating, e.g., in accordance with a corrected control characteristic.

In contrast to the related art, it is not assumed that the target parking track is followed by the system as intended, but rather, an actual course is determined for monitoring and subsequent regulation, in order to be able to perform comparisons. This actual course is compared to the target course, in order to ascertain an error. This error is used, in turn, in the application of corrective measures, particularly in the generation of a correction parameter (which may numerically correspond to the error essentially indirectly or directly); the steering angle, which is transmitted to the controller, being provided in accordance with a combination of the set angle and the correction parameter (that reflects the error). A control characteristic, which is generated in accordance with determined errors, is also designated as a correction parameter. In contrast to the related art, in which the steering angle corresponds exactly to the target parking track and it is assumed that the system accurately follows the target parking track, the present invention controls the steering system in accordance with a combination of this (target) steering angle and the correction parameter. The consideration of a correction parameter determined beforehand, i.e., the consideration of the detected error between the actual course and the target course, also allows accurate parking in accordance with the target parking track in the case of faulty steering systems, since the controlling of them is associated with an error compensation that utilizes the correction parameter.

The consideration of the correction parameter that reflects the determined error may be referred to and provided as both regulation and calibration; the calibration consisting in that the controlling system is still controlled using the target course, but implements this course according to the correction parameter and transmits it to the corresponding actuator. The correction of such a control system corresponds to a calibration, the calibration of the present invention being based on the comparison of an actual course to a target course. In this connection, the regulation approach of the present invention is provided in that an error between the target course and actual course is determined, and this error is taken into account in the controller. To be sure, the regulation of the present invention differs from the calibration of the present invention in that in the regulation, the error is continuously determined during the control, and in the calibration, the error is initially determined in order to be used for future control operations, but the concept of the present invention is implemented by both aspects.

Accordingly, an error between the target and actual course is determined, and during the parking operation, this error is taken into account in the control. Because of this, according to the present invention, the term calibration and the term regulation relate to the same concept, namely, the determination of an error between the actual course and target course and the consideration of this error during the control. Therefore, in the following, the term calibration is not distinguished from the term regulation, if not otherwise indicated.

Therefore, the method of the present invention for calibrating a parking aid relates to a parking aid, which is configured to actively control a steering angle of a vehicle. In particular, electromechanical actuators, which are connected to the steering system of a vehicle, are referred to as an active controller. In particular, motor vehicles such as passenger cars or trucks, in which one axle (or also both axles) may be pivoted in order to determine the direction of the vehicle by steering, are referred to as a vehicle. In addition, electrohydraulic or electropneumatic force transducers are suitable as actuators. The control may be provided electronically, but in principle, pneumatic or hydraulic controllers are also conceivable. However, in the case of the implementation options last mentioned, transducers must be provided in order to convert electric sensor signals into corresponding physical pressure quantities.

The method of the present invention provides that a parking space be automatically detected with the aid of sensors, that is, by driving by the parking space; the sensors may be directed to the side of the vehicle, in order to detect other (parking) vehicles or corresponding obstacles. The sensors may be ultrasonic or radar sensors, for example.

In addition, a target course is calculated in view of the parking space detected in this manner. This calculation further includes a characteristic of the steering angle along the path to be covered. The course may be approximated by straight lines, circular segments and clothoids, the individual segments of the course corresponding to a particular characteristic curve of the steering angle. In particular, the course corresponds to the integral of the corresponding characteristic of the steering angle. For example, circular segments result from a constant steering angle whose magnitude is not zero, straight lines result from a constant steering angle of zero and clothoids result from a linear increase or linear decrease of the steering angle along the course. Using the geometric data of the parking space (in particular, its length and the location of the front end), a target course may be generated, which is subdivided into segments that correspond to a particular steering angle or a particular characteristic of the steering angle (cf. linear increase or decrease, for example).

The present invention further provides that the characteristic of the steering angle obtained in this manner or the target course obtained in this manner be provided by controlling a controllable actuator. The controllable actuator is, for example, an electromechanical actuator as described above, which receives digital or analog signals that represent the desired steering angle to be set; the actuator generating a corresponding motion, a corresponding torque or a corresponding force, in order to operate the steering system of the vehicle in accordance with the intended steering angle.

The method further includes the steps of determining an actual course that results from the controlling according to the target course or according to the steering angle to be set. The actual course may be provided using an entire trajectory represented by geometric data, and may be subdivided into segments in which the steering angle to be set has a particular, precisely defined characteristic (e.g., segments having a constant angle, having a constant angle equal to zero or having a linearly increasing/decreasing angle). The actual course may also be determined using the monitoring of the actual steering angle prevailing in the steering system of the vehicle, since this is clearly linked to the actual course. In addition, a direction or an actual steering angle, which corresponds to a maximum steering angle to be set, may be provided as an actual course. Furthermore, the actual course may be determined by repeatedly measuring a lateral clearance after the vehicle has driven into the parking space. However, the determination of the actual course may be provided by measuring the maximum steering angle present in the steering system of the vehicle, this corresponding to maximum, controlled steering angle.

According to the present invention, this actual course (which may also only be provided as angle data) is compared to the target course (which may also only be provided as a setpoint steering angle), and the error resulting from the comparison is ascertained. The comparing may be provided as a calculation of the difference between a steering angle to be set and the steering angle actually present in the steering system (setpoint-to-actual comparison), the error corresponding to the difference. In particular, the error is provided as a value that corresponds to the differential value calculated.

In addition, in a particularly simple variant, a correction parameter is generated that is equated with the error. In general, the generated correction parameter is linked to the error by a monotonic function. Thus, if the magnitude of the error increases, then the correction parameter (or its magnitude) increases as well. The monotonic function may be a monotonic or strictly monotonic function, for example, a linear or directly proportional function; the monotonic function being able to be a monotonically increasing or a monotonically decreasing function. The function is selected as an increasing or decreasing function, depending on how the correction parameter formed in this manner is taken into account during the control. However, the present invention should provide that the combination of the set angle with the correction parameter and the generation of the correction parameter result in at least partial compensation for the error in the controller.

According to the method of the present invention, the steering angle is combined with the correction parameter, e.g., by addition (or by subtraction, depending on if the function is increasing or decreasing); the control variable corresponding to this combination. Thus, the control is based not only on a specified steering angle, but also on a correction parameter to be combined with it prior to the driving of the actuator, the correction parameter representing the conversion between the angle to be set and the angle actually generated.

According to a first aspect of the present invention, the actual course is determined by measuring an actual actuating angle in light of the position of a steering wheel, a steering linkage, the actuator or another component of the steering system. The actual actuating angle may be measured, in particular, by an angular position transducer, which is connected to the corresponding component. The direct measurement of the actual actuating angle may also be provided by evaluating a course. If, according to this aspect of the present invention, the actual course is determined by the actual actuating angle, then a relatively simple calculation results, since the actual actuating angle is simply a single piece of numerical data, which accordingly requires a small amount of computing expenditure. In principle, the angular position may be measured by an angular position sensor or angular position transducer at any location of the steering system that moves during steering.

According to a second aspect of the present invention, the actual course is determined not only with the aid of a single piece of angle data, but also with the aid of an entire location curve, which may be in the form of a location curve, which describes the motion of the vehicle. The location curve may further represent the motion of the vehicle part or also the motion of a sensor or a sensor apparatus, which is attached to the vehicle. In principle, the course may be determined with the aid of any vehicle component that is connected to the vehicle. In addition, the actual course may be determined by repeated, continuous or continued sensor measurement, the sensor may measure the distance to, or also a position of the vehicle relative to, an external object.

According to another exemplary embodiment of the present invention, the controlling of the steering angle includes the driving of the actuator, using a setpoint maximum steering value. The determination of the actual course includes: measuring an actual maximum steering value, which results from the driving using the setpoint maximum steering value. According to this variant, a setpoint maximum steering value is specified, and using an actual maximum steering value, it is ascertained whether the steering gear follows the setpoint maximum steering value completely or accurately implements it, or whether an actual maximum steering value results, which is less than the planned maximum steering value that would result from setting the setpoint maximum steering value in an optimum system.

Consequently, a setpoint maximum steering value is used as a target input point; by comparison with the actual maximum steering value actually implemented, it being determined whether the system completely follows the setpoint maximum steering value, or whether the system cannot follow the setpoint maximum steering value due to errors. The error results from the difference between the setpoint maximum steering value and the actual maximum steering value. An algebraic sign that takes the steering direction into account may be applied to the difference. In particular, the difference may be formed by the difference between the magnitude of the setpoint maximum steering value and the magnitude of the actual maximum steering value.

According to the preceding specific embodiment, the error is ascertained by inputting a maximum steering value and by monitoring the reaction of the steering system. In this connection, the actual maximum steering value may be determined by ascertaining the position of the steering wheel, the steering linkage, the actuator or another component of the steering system of the vehicle. In doing this, the determination of the actual maximum steering value actually implemented is based on the measurement of an angle by an angular position transducer. As an alternative, the actual maximum steering value may also be ascertained on the basis of the maximum curvature of the actual course measured. In this connection, the maximum curvature of a segment of the location curve is ascertained, this segment producing a result of the setpoint maximum steering value. Consequently, it is ensured that the maximum curvature inside of this segment is the result of the driving, using the setpoint maximum value. In this connection, the location curve corresponds to the actual course that represents the motion of the vehicle. Therefore, the actual course is the location curve of a component which is attached to the vehicle, e.g., a sensor by which the parking space is detected. Thus, in the last-mentioned method, the actual maximum steering value is ascertained by observing the motion characteristic of the vehicle.

According to another exemplary embodiment of the present invention, which is combinable, in particular, with the above-mentioned specific embodiments that are based on maximum steering values, a first parking step is executed based on experience, and a second parking step directly or indirectly after that; different maximum steering values being used in the two parking steps. In the second parking step, the maximum steering angle (in general: the control variable) is greater than in the first parking step, in order to successively ascertain, in this manner, the limits of the steering system. In this connection, control parameters, in which an increase in the displacement results in marked errors, are referred to as limits of the steering system. This is the case, for example, when an operating limit, e.g., the displacement limit, a maximum angular position of the actuator or a maximum torque of the actuator, is reached. At this point, a region of oversteering begins, which manifests itself in that a further, additional increase in the control signal is not implemented completely. This is also the case, for example, with high steering angles, in which the tires generate a reaction force too high for the actuator to be able to continue steering in the tires in accordance with the control. Further sources of error include, for example, play in the steering or friction within the steering system at high displacements; the incrementing or increase between two parking steps being used to determined the critical point, as of which the angle control is faulty.

Therefore, the method includes the execution of a second parking step by driving at a maximum steering angle, which is increased by a control increment in comparison with the first parking step. In this connection, the maximum actual curvatures of the respective, resulting, actual course are compared to one another, in order to determine whether the control increment is implemented completely or only partially by the steering system. If it is detected that the increase in the control increment is insufficiently converted into an additional, actual steering angle, then this angle may be stored, and future target courses are developed in such a manner, that they have a maximum curvature that is not greater than the measured, maximum actual curvature (or the associated steering angle).

According to the present invention, maximum steering angles measured in this manner are stored temporarily, in order to be able to be considered in subsequent parking steps. The specific embodiment described along these lines is based on provoking an error by increasing the maximum steering angle to an inaccuracy limit, up to which the system may follow the specified angle, but after which the maximum steering angle generates considerable inaccuracies. The correction parameter then consists in a value that specifies a cap, so that in subsequent target courses, a steering angle greater than the maximum steering angle obtained in this manner is not used. This cap may also be used for generating/modifying a control characteristic.

The control increment is increasingly raised with each parking step, and the maximum actual curvature resulting during each parking step is specifically measured. The respective, maximum actual curvatures of the parking steps are compared to one another. In this connection, the increase in the corresponding, maximum actual curvatures of consecutive parking steps is particularly measured. The correction parameter then results from the detection of a reduction in or a lack of increase during the comparison of maximum actual curvatures of consecutive steps. If, for example, the maximum steering angle is regularly increased by a control increment, then a reduction or a lack of increase may be detected by a flattening characteristic of the increase in the maximum actual curvatures. The correction parameter then indicates a cap of the controllable steering angle. This corresponds to a calibration, by which target parking tracks generated according to it are calibrated and, therefore, do not have a maximum curvature, which is equal to or greater than the maximum actual curvature.

Instead of determining the limit of an error-free control by measuring the maximum steering angle for consecutive parking steps, the steering angle may also be successively increased during one and the same parking step. In this connection, the resulting actual course is simultaneously measured (either by determining the location curve along which the vehicle moves, or by ascertaining the position of the steering wheel, the steering linkage, the actuator or another steering system component), and the corresponding, (current) set steering angle (according to the target course) is measured. If the situation occurs in which the steering angle is indeed increased further, but the actual course or the position of the steering system component no longer follows this increasing steering angle (completely), then the set steering angle or the position of the steering wheel, as of which an increase in the steering angle no longer results in the desired increase in the position of the steering wheel, may be ascertained.

In this connection, the curvature is increased continuously or, in particular, stepwise, that is, incrementally. The increase in the curvature of the actual course resulting from this or the increase in the angular position of a longitudinal system component is measured, and by comparison, it is determined whether the system is momentarily operating in an error-free control range or is already operating in a faulty control range. In this connection, increasing curvature or increasing steering angle means an increasing level of steering-in, independent of the algebraic sign or the steering direction, which means that these terms are synonymous with the magnitude of the curvature or the magnitude of the steering angle.

Therefore, the steering angle is measured, at which the increase in the curvature (the magnitude of the curvature) of the actual course or the position of the longitudinal system component is less than the increase in the curvature of the target course or less than the increase in the set steering angle. The correction parameter is then provided with a value, which corresponds to this curvature or to this position or to the corresponding steering angle; the correction parameter being set to a value that corresponds to the steering angle of lower increase. In this connection, the determination of the lower increase (of the steering angle) is synonymous with the determination of a range, in which the control system no longer operates linearly or poorly implements the target course or the steering angle to be set. The corresponding correction parameter is stored and subsequently provided as a cap for the target course, which means that in a further parking step, the controlling of the steering angle in accordance with this cap does not go beyond it. In particular, the target course of subsequent parking steps is provided in such a manner, that its maximum curvature (as far as the magnitude is concerned) is not greater than this cap.

To determine whether, in the case of an increasing steering angle, the actual course resulting from it follows, a (predefined) threshold value may be provided, which is compared to the magnitude of the deviation, and only results in the determination of the correction parameter as of a predetermined error-magnitude threshold or difference. This may be implemented, for example, using a comparator and a predefined threshold value; the comparator comparing the threshold value to the deviation between the setpoint and actual magnitude, and, in response to the threshold value being exceeded, causing the system of the exemplary embodiments and/or exemplary methods of the present invention to store the corresponding steering angle or the corresponding setpoint curvature. This stored value corresponds to a calibration value, which is used in subsequent parking maneuvers, in order to prevent the steering angle to be set from being in a range in which the control is faulty.

Therefore, the method described along these lines calibrates a controller in accordance with a standard interval, in which the steering angles to be set are permissible, and in accordance with a limit, at or above which the magnitudes of the steering angle result in faulty implementation. Instead, or in combination with this, a linear error may also be measured and used for calibration; the steering angle to be set being increased, and the corresponding implementation determined by measuring the actual course, as described above, being compared to this. If it is detected that the implementation is not completely provided, and that the actual angular increase differs from the setpoint angular increase, then the quotient of the setpoint and actual angular increase may be calculated. This quotient is used for calibration in further control instances and parking steps, e.g., in order to multiply the steering angle to be set by the reciprocal value of the quotient, before the steering angle to be set is used for control. In this manner, errors that increase linearly or directly proportionally with increasing steering angle may be compensated for.

The exemplary embodiments and/or exemplary methods of the present invention may also be implemented by a controller that is used to execute the above-described method. The controller includes an input for acquiring physical environmental features (for detection of the parking space), as well as for monitoring the actual course and the directional change that results from the control. The controller further includes an output for driving an actuator according to the steering angle to be set. A processing unit of the controller is connected to the input and the output and calculates the target course in light of the environmental features. In addition, this processing unit takes the correction parameter into consideration, in that the target course is provided, for example, with a maximum curvature that lies under a steering angle, at or above which the actual course only follows the set steering angle in a faulty manner.

The controller further includes a comparator, in order to determine this error. In particular, the comparator is configured to compare the actual course to the target course, the comparator being further able to ascertain a possible error. The controller further includes a correction device, which takes into account the above-described correction parameter. The correction device is configured to generate the correction parameter as a function of the error, and is configured to correct the target parking track, the steering angle to be set, or both. In this connection, the correction device combines the target course or the steering angle to be set, with the correction parameter. According to a particular specific embodiment, the combination provided by the correction device includes the cap of a target course to be generated, in accordance with a maximum steering angle at or above which the steering system only follows the target inputs in a faulty manner.

To determine the actual course or the steering angle, the controller further includes an angular position transducer, which may be mechanically connected to a steering system component. This steering system component may be provided in the form of a steering wheel, steering linkage, or an actuator that actuates the steering gear. The angular position transducer measures the angular position of the specific vehicle component, which may also be the chassis of the vehicle; the angular position transducer further being connected to the input, in order to output angular signals to it that stand for the measured angle.

To determine the maximum possible curvature or the maximum possible steering angle, the controller further includes an incrementing device, in order to increase a control increment or the steering angle to be set, which may be stepwise, with a constant step height. The corresponding, resulting maximum curvature of the resulting, actual course is determined and evaluated. In this connection, the controller evaluates whether the increase of the control increment results in a maximum curvature of the actual course. The controller determines whether the increase in the control increment corresponds to the increase in the curvature of the actual course, or whether the increase in the control increment is less than the maximum curvature of the actual course. In this connection, the controller determines whether the increase in the control increment leads to a maximum curvature of the actual course, whose increase is less than a predefined threshold value with respect to a maximum curvature, which occurred prior to the increase in the control increment. In other words, the deviation between a setpoint and actual angle in the event of an increase in the control increment is determined by the controller in light of a predefined threshold value. A comparator compares the threshold value to the difference between the respective increases in the setpoint and actual values.

In this connection, exceedance of the threshold value means that the actual angle does not follow the setpoint angle in an error-free manner, and that therefore, the controller is in a range in which the target input is not implemented in an error-free manner. If the threshold value is exceeded, then the set steering angle or the curvature of the actual course is stored as a basis for calibration. In further control instances or parking maneuvers, the steering angle to be adjusted or the curvature of the target course is capped by a limiter of the system in accordance with the stored calibration basis, in order to ensure that during parking, the system does not run in a range in which the actual angle no longer follows the setpoint angle completely. The calibration basis may be stored in a memory of the system, the limiter of the system being linked to this memory, in order to take the calibration into consideration during the generation of the target course or during the control of the steering angle to be set.

The device of the present invention is implemented with the aid of a microcontroller and corresponding software or corresponding software elements, the software or the software elements implementing individual or several components of the controller. Instead of, or in combination with a programmable processor, closed-circuit connections, whose function is predetermined by their configuration, may also be used. In particular, the comparator may be provided by a hardware comparator circuit. The input and the output may be provided as both digital and analog signal interfaces; when analog signals are used, the input and the output may include an analog-to-digital and a digital-to-analog converter, respectively.

According to a specific embodiment of the device and of the method, initially, for several consecutive parking operations, the maximum setpoint steering angle may be increased by an increment for each consecutive parking operation, until the maximum possible steering angle is determined, as of which the steering system no longer follows the setpoint steering angle or only follows it in a faulty manner. In the following, the calibration of the present invention is then used as a monitoring measure, which optionally intervenes in the control.

After this maximum possible steering angle has been determined, it is taken into consideration in subsequent parking processes (by generating target courses having a maximum curvature, which does not go beyond the maximum possible steering angle) and according to the present invention, the implementation of the target course may be monitored in further parking operations by measuring the target course with the actual course, in order to re-determine, in the event of errors occurring during the further parking operations, the maximum possible parking angle (as described above), in order to then consider this for parking operations still to follow, as described above. The same sensors (distance sensor, angular position transducer) are used for the two operations. In addition, the operation for determining the maximum possible steering angle may be repeated, in order to be able to take changes in the road/tire conditions into consideration. Thus, for example, the operation for determining the maximum possible steering angle may either be repeated at regular intervals (in particular, every nth parking operation with n=20, 50 or 100, for example), or the operation is repeated in response to detected changes to the chassis and suspension, for example, after inspections and/or when new tires have been put on, or both.

During recalibration, the maximum possible steering angle is ascertained again and may be less than the previous maximum possible steering angle, e.g., if friction forces in the steering system have increased, or may be greater than the previous maximum possible steering angle, if friction forces have been reduced, as is the case when a change has been made from winter tires to summer tires. To this end, the controller of the present invention has an input, by which inspections or tire changes may be recorded, e.g., an interface for user inputs.

DETAILED DESCRIPTION

Figure 1A:
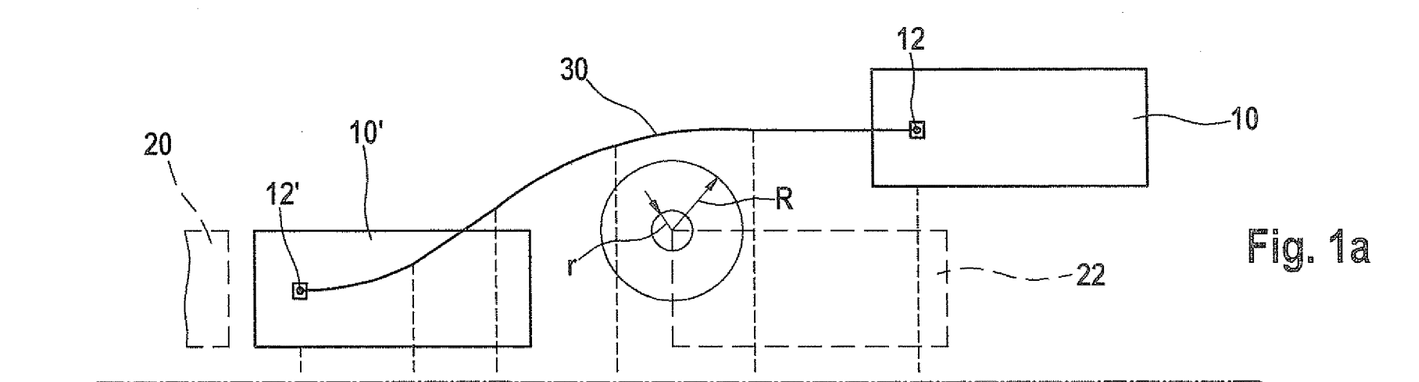
FIGS. 1a and 1b show an example situation for a parking operation according to the present invention, FIG. 1b illustrating the corresponding steering angle. In particular FIGS. 1a and 1b jointly show the example situation with the aid of the half above the dot-dash line that is referred to as FIG. 1a, and with the aid of the half beneath the dot-dash line that is referred to as FIG. 1b.

FIG. 1a shows a vehicle in a first position 10 and a second position 10'; after having driven by a parking space, the vehicle having the reference numeral 10 driving backwards into it and parking in it, and remaining in position 10'. The parking space extends between vehicles 20, 22, whose periphery is illustrated by a dashed line, and between which the parking space for vehicle 10' is situated. The parking aid of the present invention controls the steering operation, so that in the case of backing into a parking space, a target course 30 is generated that also corresponds to the actual course. The movement of a point 12, 12' of vehicle 10, 10', which is guided by vehicle 22 at a distance 40, is considered. This point 12, 12' of vehicle 10, 10' is situated inside of the vehicle, so that a minimum distance r is generated for a vehicle edge. The distance relates to the most critical location of vehicle 22, that is, the corner which is facing the parking space and is also facing vehicle 10, 10'.

The target course includes a first segment 40, in which the vehicle travels to the left in a straight line, parallel to vehicle 22. A second segment 42 follows, in which steering angle φ of the vehicle increases linearly, thereby producing an increasing curvature. In a third segment 44, the steering angle linearly decreases to a steering angle of zero. Thus, at a single point at the left end of segment 44, there is a steering angle φ of zero, at which the target or actual course at least momentarily corresponds to the longitudinal axis of the vehicle in the current position. A segment 46, in which steering angle φ is increasingly raised until a maximum is reached, follows segment 44. A fifth segment 48 follows, in which the orientation of the vehicle is aligned parallel to the original orientation by continuously (that is, linearly) reducing steering angle φ to zero.

Figure 1B:
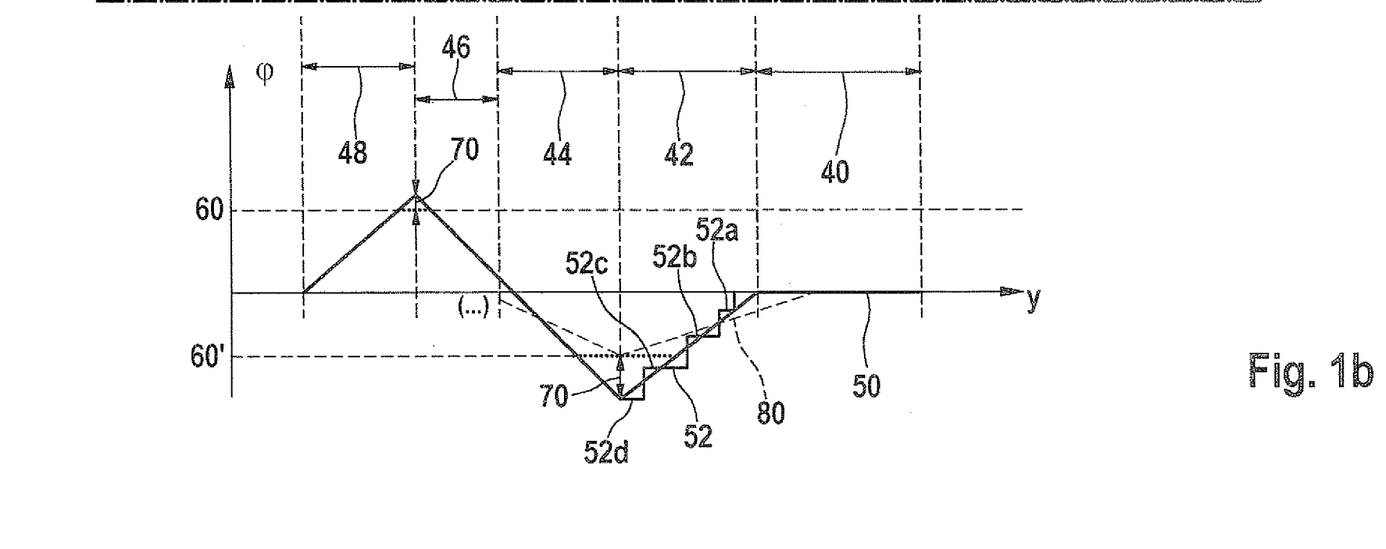

In FIG. 1b, steering angle φ is exemplarily illustrated using a solid line, the individual y-segments 40-48 referring to the respective location of the vehicle in FIG. 1a. Solid line 50 corresponds to the characteristic of the steering angle in an ideal system, which does not require calibration according to the present invention.

However, as already remarked, real systems are subject to a maximum steering angle, which is designated by 60, 60' in FIG. 1b. At or above this angle, the actuator-based steering system no longer supports the target course or the steering angle to be set, but the magnitude of the curvature no longer increases with increasing magnitude of the curvature of the target course. The resulting capping is represented by a dotted line in FIG. 1b; at or above maximum steering value 60, 60', the steering system no longer following completely despite the increase of the setpoint input. According to the exemplary embodiments and/or exemplary methods of the present invention, the error 70 between the setpoint and actual inputs of the steering angle is ascertained, in order to provide the correction parameter as a cap of the steering angle to be set. This cap, which results from limiting values 60, 60', is considered in future calculations of the target course, which may yield an adjusted target course 80.

The target course 80, which is illustrated by a dashed line and corrected according to the correction parameter, takes the lower maximum steering value (60') into account, whereby it should be noted that the steering phase in corrected target course 80 starts earlier, in order to ensure that in spite of the lower maximum steering value, the vehicle does not come to rest laterally offset from vehicles 20, 22 and that, consequently, the vehicle is not situated in the parking space in a non-optimum manner. The corrected target course illustrated in FIG. 1b has a shape similar to uncorrected characteristic 50. In particular, the two characteristics do not have a segment, in which a steering angle unequal to zero is maintained. However, a corresponding, adjusted target course could have a shape different from a target course provided without correction, e.g., by keeping the set steering angle constant upon reaching the maximum steering value; this produces a trapezoidal characteristic of steering angle $\phi$.

According to the exemplary embodiments and/or exemplary methods of the present invention, the steering angle to be set is increased in steps, cf. see curve shape 52, the increments each being equal. The step width of the steering angle to be set of characteristic 152 is shown increased in size, in order to illustrate the present invention more effectively. It can be seen that in first iteration step 52a and in second iteration step 52b, the steering angle to be set is also completely implemented, since maximum steering value 60' has not yet been reached. However, during incrementing step 152c, an error results between the steering angle to be set of characteristic 152 and the exceeded, actual maximum steering value, which is illustrated by a dotted line.

This error between the steering angle to be set of iteration step 52c is compared to actual maximum steering value 60' (which also corresponds to the actual steering value present during incrementing step 52c), the error being relatively small, since in the example illustrated in FIG. 1b, the steering angle to be set in incrementing step 52c is only slightly greater than the actual maximum steering value (illustrated by a dotted line), which also corresponds to the actual steering value. The error value is less than an error threshold value, which means that upon comparing the two values, a comparison result signal corresponding to the occurrence of an error is still not generated. However, since the following incrementing step 52d results in a steering angle to be set, which is considerably greater than the maximum steering value, an error 70 results that is considerably greater than the permissible error. Therefore, the comparison to the error threshold value results in the detection of the occurrence of an error at this setpoint angle. Consequently, in comparison with incrementing step 52c, it is clear that during incrementing step 52c, the steering angle to be set was within possible parameters, and that incrementing step 52d resulted in a steering angle to be set (i.e., setpoint angle), which is too high. Thus, according to the method, the steering angle to be set of incrementing step 52c is stored as a cap that reflects the correction parameter.

Then, in subsequent parking methods, the stored correction value having a magnitude of steering angle 52c is no longer exceeded. The same also applies during the same parking operation, so that during a step 52d, which results in an undesirably high error value, the steering angle to be set is automatically returned to the value of incrementing step 52c. At the same time, this is considered upon selection of the target course, in order to park the vehicle as desired without, however, operating the steering system in a range that is associated with errors, which are too high and would result, in turn, in instances of unwanted malpositioning of the vehicle to be parked.

Figure 2:
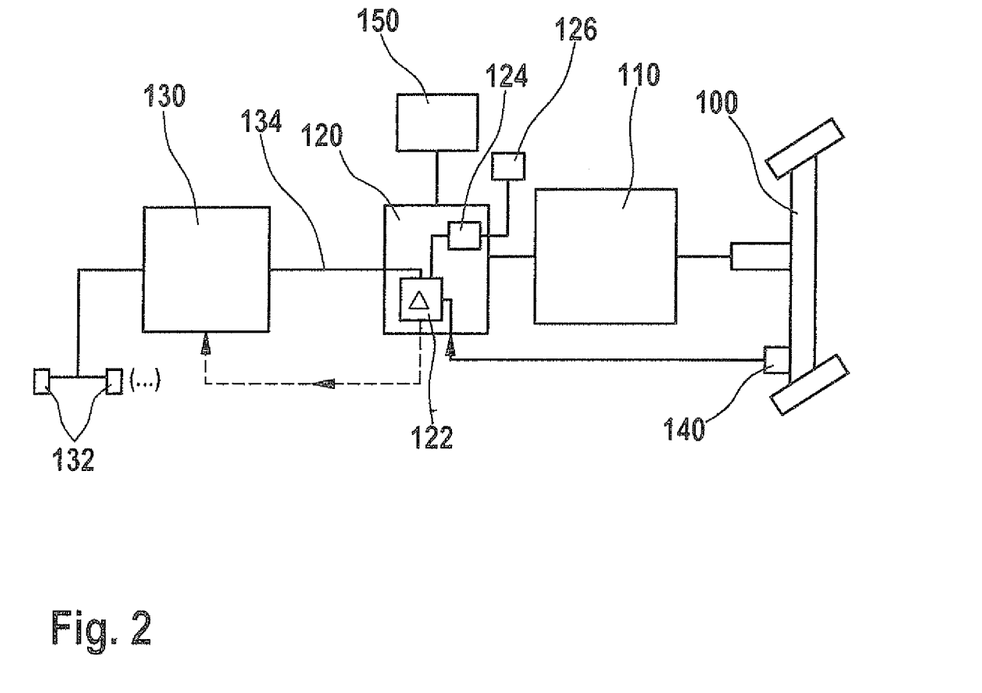
FIG. 2 shows a variant of the controller of the present invention for implementing the method of the present invention.

FIG. 2 shows a general block diagram of a controller according to the present invention. The system of FIG. 2 includes a steering system 100 of a vehicle (not shown), the mechanical steering system 100 being mechanically actuated by an actuator 110. This actuator 110 corresponds to an electromechanical transducer, which is electrically driven by a control unit 120. Control unit 120 receives signals from a processing unit 130, which specifies a target course. The target course is determined with the aid of parking assistance sensors 132, which are positioned as distance sensors at an outer side of the vehicle. As an alternative, a vehicle camera and an image processing device may be used for detecting parking spaces. Steering system 100 is coupled to a sensor 140, which measures the actual steering angle and transmits it to control unit 120, in particular, to comparator 122 of control unit 120. Comparator 122 of control unit 120 further receives a setpoint steering angle (as a result of the calculated target course), that is, the steering angle to be set, via a connection 134, which also connects control unit 120 to processing unit 130. Comparator 122 compares the setpoint input, which is supplied to control unit 120 via connection 134, to the sensor data of sensor 140, in order to determine if the steering angle to be set is no longer being implemented completely and, consequently, if the actual steering angle is less than the steering angle to be set.

The difference is identified as an error by comparator 122. If the error reaches a threshold value, the corresponding, actual steering angle (which is provided by sensor 140) is then stored in correction parameter memory 150. Correction parameter memory 150 then stores the actual steering angle, at or above which error-free control is no longer possible.

According to a specific embodiment, memory 150 further stores the magnitude of the error associated with it. In order to compare the error provided by comparator 122 to a maximum permissible error, control unit 120 further includes a threshold switch 124, which obtains a maximum permissible error from an error memory 126. According to a specific embodiment, which is illustrated in FIG. 2 by a dashed line, comparator 122 transmits the error and, in particular, the corresponding steering angle to processing unit 130 (see dashed-line connection), so that processing unit 130 may consider the maximum steering value during the next calculation of the target course.

What is claimed is:

1. A method for calibrating a parking aid, which is configured to actively control a steering angle of a vehicle, the method comprising:
   automatically detecting a parking space with the aid of sensors;

calculating a target course in light of the detected parking space;
controlling the steering angle in accordance with the calculated target course by using a controllable actuator;
determining an actual course, which results from the controlling in accordance with the target course;
comparing the actual course to the target course and ascertaining the error resulting from the comparison; and
generating a correction parameter, which is linked to the error by a monotonic function;
wherein the controlling of the steering angle includes controlling it according to a combination of the steering angle with the correction parameter, wherein controlling the steering angle includes driving the actuator, using a setpoint maximum steering value, and wherein determining the actual course includes measuring an actual maximum steering value, which results from the driven actuator using the setpoint maximum steering value, the ascertained error being the difference between the setpoint maximum steering value and the actual maximum steering value,
wherein a first parking operation and a second parking operation following the first parking operation are executed,
wherein the second parking operation is executed by driving using a maximum steering angle, which is increased by a control increment in comparison with the first parking operation,
wherein maximum actual curvatures of the respectively resulting and actual course are compared to one another,
wherein several parking operations are executed,
wherein the control increment is increasingly raised with each parking operation,
wherein the maximum actual curvature resulting during each operation is determined,
wherein the respective, maximum actual curvatures of the operations are compared to one another,
wherein an increase in the maximum actual curvatures of consecutive parking operations is measured,
wherein the correction parameter is provided by detecting a decrease or a lack of the increase upon comparing maximum actual curvatures of consecutive operations, and
wherein the correction parameter represents a cap of the controllable steering angle and at least one subsequent target parking track having a cap of the maximum curvature equal to the maximum actual curvature is provided.

2. The method of claim 1, wherein determining the actual course includes one of: (i) measuring an actual actuating angle with the aid of an angular position sensor, in light of the position of a steering wheel, a steering linkage or the actuator; and (ii) determining one of the actual courses in the form of a location curve, which represents the motion of the vehicle, of a vehicle part or of at least one sensor provided for detecting the actual parking track.

3. The method of claim 1, wherein measuring the actual maximum steering value is provided by one of: (a) ascertaining the position of the steering wheel, the steering linkage or the actuator, and (b) ascertaining the maximum curvature of a segment of the actual course, which results from the setpoint maximum steering value; the actual course representing the motion of the vehicle.

4. The method of claim 1 wherein the target course is provided with a curvature, whose magnitude increases continuously or step-wise along the target course, wherein the steering angle is controlled according to this curvature, wherein an increase in the magnitude of the curvature of the actual course resulting from it is determined, further comprising:
comparing the curvature of the actual course to the curvature of the target course;
determining the steering angle at which the increase in the curvature of the actual course is less than the increase in the curvature of the target course;
providing the correction parameter with a value of this steering angle of lesser increase; and
providing at least one subsequent target course with a capped curvature magnitude, which corresponds to the correction parameter.

5. A controller, comprising:
a controller arrangement, including:
an input configured to acquire the actual course and to acquire physical environmental features with the aid of the sensors;
an output configured to output the steering angle to the actuator;
a processing unit, which is connected to the input and to the output and is configured to calculate a target course in light of the environmental features;
a comparator configured to compare the actual course to the target course and to ascertain the error resulting from the comparison; and
a correction device configured to generate the correction parameter as a function of the error and to correct the target course, the steering angle to be set, or both by combining the target course or the steering angle with the correction parameter;
wherein the controller arrangement is operable for calibrating a parking aid, which is configured to actively control a steering angle of a vehicle, by performing the following:
automatically detecting a parking space with the aid of sensors;
calculating a target course in light of the detected parking space;
controlling the steering angle in accordance with the calculated target course by using a controllable actuator;
determining an actual course, which results from the controlling in accordance with the target course;
comparing the actual course to the target course and ascertaining the error resulting from the comparison; and
generating a correction parameter, which is linked to the error by a monotonic function;
wherein the controlling of the steering angle includes controlling it according to a combination of the steering angle with the correction parameter, wherein controlling the steering angle includes driving the actuator, using a setpoint maximum steering value, and wherein determining the actual course includes measuring an actual maximum steering value, which results from the driven actuator using the setpoint maximum steering value, the ascertained error being the difference between the setpoint maximum steering value and the actual maximum steering value,
wherein a first parking operation and a second parking operation following the first parking operation are executed,
wherein the second parking operation is executed by driving using a maximum steering angle, which is increased by a control increment in comparison with the first parking operation, wherein maximum actual curvatures of the respectively resulting and actual course are compared to one another, wherein several parking operations are executed, wherein the control increment is increasingly raised with each parking operation, wherein the maximum actual curvature resulting during each operation is determined, wherein the respective, maximum actual curvatures of the operations are compared to one another, wherein an increase in the maximum actual curvatures of consecutive parking operations is measured, wherein the correction parameter is provided by detecting a decrease or a lack of the increase upon comparing maximum actual curvatures of consecutive operations, and wherein the correction parameter represents a cap of the controllable steering angle and at least one subsequent target parking track having a cap of the maximum curvature equal to the maximum actual curvature is provided.

6. The controller of claim 5, further comprising:

an angular position transducer, which is mechanically connectable to the steering wheel, the steering linkage, or to the actuator provided for actuating the steering gear, to measure the angular position of the respective vehicle component, wherein the angular position transducer is further connected to the input to output signals to it that represent the measured angle.

7. The controller of claim 5, further comprising:

an incrementing device, which is configured, during the same parking operation executed or for consecutive parking operations executed to increase the maximum steering angle, which is output at the output, by the control increment, wherein the controller arrangement is configured to determine the corresponding maximum curvature of the actual parking track, and to evaluate if the increase in the control increment results in the maximum curvature of the actual parking track, which is increased less than a predefined threshold value with respect to a maximum curvature, which was produced prior to increasing the control increment.

* * * * *